United States Patent [19]

Sundholm

[11] Patent Number: 5,028,020
[45] Date of Patent: Jul. 2, 1991

[54] PIPE CLIP

[76] Inventor: Göran Sundholm, Magistervägen 34 B, SF-02700 Grankulla, Finland

[21] Appl. No.: 460,162

[22] PCT Filed: Aug. 3, 1987

[86] PCT No.: PCT/FI87/00100
§ 371 Date: Jan. 24, 1990
§ 102(e) Date: Jan. 24, 1990

[87] PCT Pub. No.: WO89/01107
PCT Pub. Date: Feb. 9, 1989

[51] Int. Cl.$^5$ .............................................. F16L 3/21
[52] U.S. Cl. .............................. 248/74.4; 248/219.4; 248/638
[58] Field of Search ............. 248/49, 62, 74.4, 219.4, 248/638, 901

[56] References Cited

U.S. PATENT DOCUMENTS

| 2,113,083 | 4/1938 | Height | 248/49 |
| 2,463,880 | 3/1949 | Jones | 248/901 |
| 2,975,998 | 3/1961 | Clift | 248/219.4 |
| 3,980,262 | 9/1976 | Lee | 248/49 |
| 4,143,844 | 3/1979 | Van Meter | 248/901 |
| 4,425,813 | 1/1984 | Wadensten | 248/638 |
| 4,429,847 | 2/1984 | Jablonski | 248/901 |
| 4,709,886 | 12/1987 | Smart | 248/901 |

Primary Examiner—Reinaldo P. Machado
Attorney, Agent, or Firm—Ladas & Parry

[57] ABSTRACT

The invention relates to a device for securing a pipe (1) to a seat (2). A clip (4) is tightened around the pipe (1) by fixing both ends thereof to the seat (2). The object is to provide a securing device which is able to follow the longitudinal movements of the pipe without losing its grip around the pipe. This is achieved in such a way that cup springs (8) are arranged between the seat (2) and a nut (6) for fixing the clip (4).

3 Claims, 3 Drawing Sheets

PIPE CLIP

This invention relates to a device for securing a pipe, comprising a seat for the pipe and a clip to be tightened around the pipe by fixing both ends thereof to the support.

Conflicting demands are made on this kind of devices, usually called pipe clips, because the pipe clip both has to grip the pipe firmly and stationarily and yield to the longitudinal movements of the pipe usually due to heat expansion and contraction. Prior pipe clips have not been able to meet these opposite requirements in any satisfying way: the pipe either slips between the clip and the seat due to the movements caused by heat expansion, whereby the grip loosens, or if the grip of the clip around the pipe prevents such slipping, the seat, often formed by a metal profile, is deformed.

The object of the present invention is to provide a new pipe clip which solves the above problems.

The device according to the invention, of the type defined in the introductory part, is mainly characterized in that resilient means are arranged between the seat and fixing means for the clip and that openings formed in the seat are provided with a clearance with respect to the clip.

By virtue of the resilience, the pipe clip according to the invention is able to follow the longitudinal heat expansion movements of the pipe, i.e. the grip around the pipes does not loosen when the clip is in a tilted position.

The resilient means are preferably formed by cup springs which take little room; however, it is likewise possible to use e.g. spiral springs. Alternatively, or in combination with cup springs, it is possible to use sleeves of a flexible, sound insulating material, whereby the propagation of vibrations from the pipe to the seat is avoided.

The invention will be described in more detail in the following with reference to the attached drawing.

Figure 1:
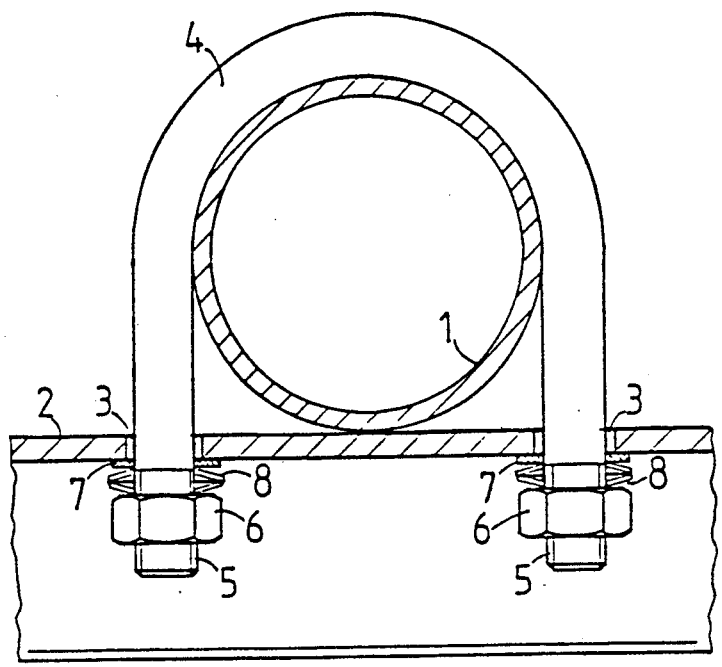
FIGS. 1, 3 and 5 show three different embodiments seen as a cross-section of the pipe to be secured.

The pipe to be secured is indicated with the reference numeral 1. It is generally made of metal so that it withstands even high pressures. The pipe 1 is placed on a seat 2, such as a metal L-profile turned upside down. A clip 4 known per se is positioned around the pipe, both ends of the clip being fixed to the seat by means of nuts 6 tightened on end threadings 5.

Figure 2:
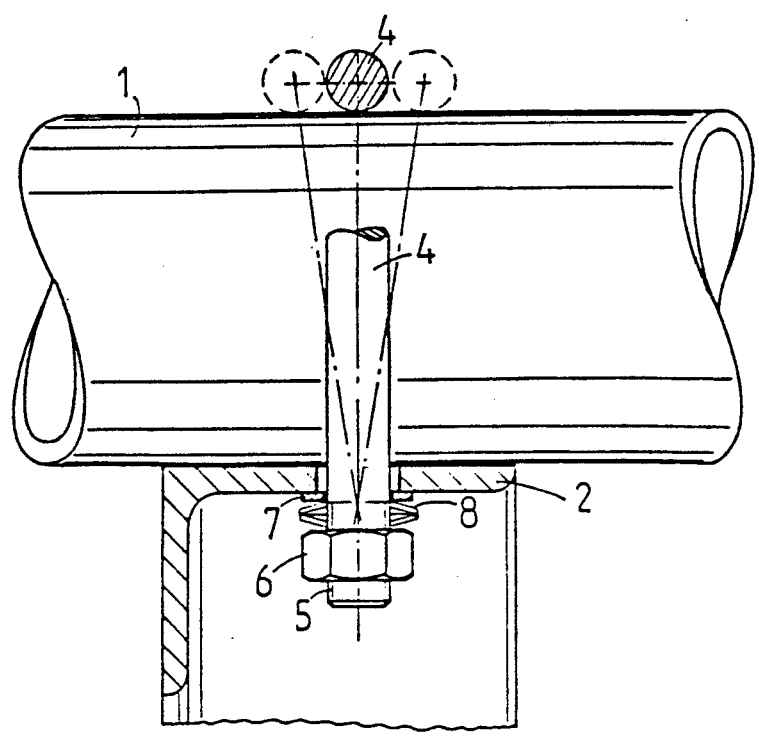
FIGS. 2, 4 and 6 show the same embodiments seen from the side.

The main novelty of the embodiment of FIG. 1 is that cup springs 8, one at each end of the clip 4, are arranged between the respective nut 6 and the seat 2. A steady metal plate 7 is fitted between the respective spring 8 and the seat as a support. The diameter of the openings 3 in the seat 2 of the pipe clip is slightly larger than that of the clip 4, whereby the clip 4, as is apparent from FIG. 2, can be tilted in accordance with the longitudinal heat expansion movements of the pipe 1 without the grip around the pipe 1 being loosened.

Figure 3:
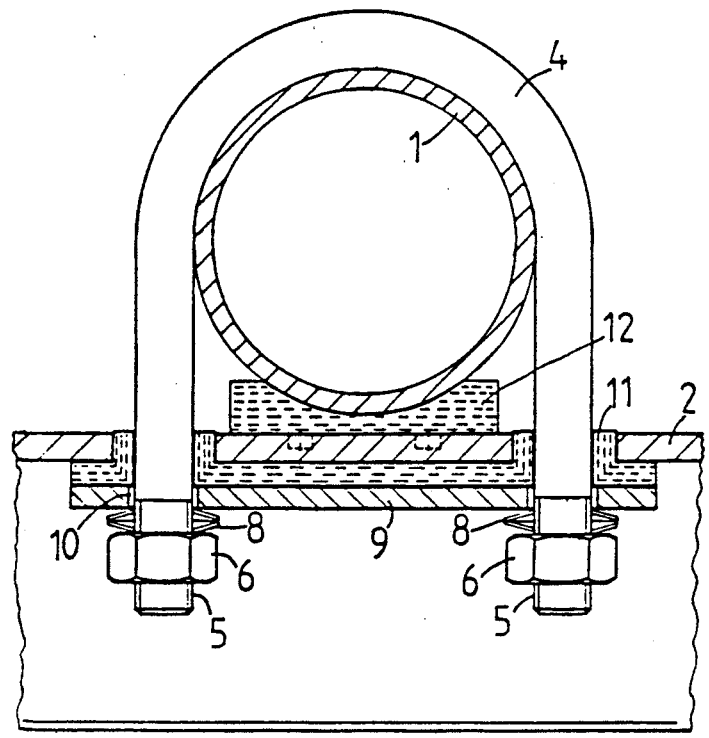

In the embodiment of FIG. 3 the clip 4 is further surrounded by sleeves 11 of a flexible, sound insulating material, and a support 12, likewise of a sound insulating material, is arranged between the pipe 1 and the seat 2. The sleeves 11 can, as in FIG. 3, be formed in one piece for each clip end or, alternatively, they can be separate. A support plate 9 is preferably arranged between the sleeves 11 and the springs 8. As appears from FIG. 4, the clip according to FIG. 3 behaves in principle in the same way as that of FIG. 1, in addition to which an insulation against vibration and sound in the pipe 1 can be achieved.

Figure 4:
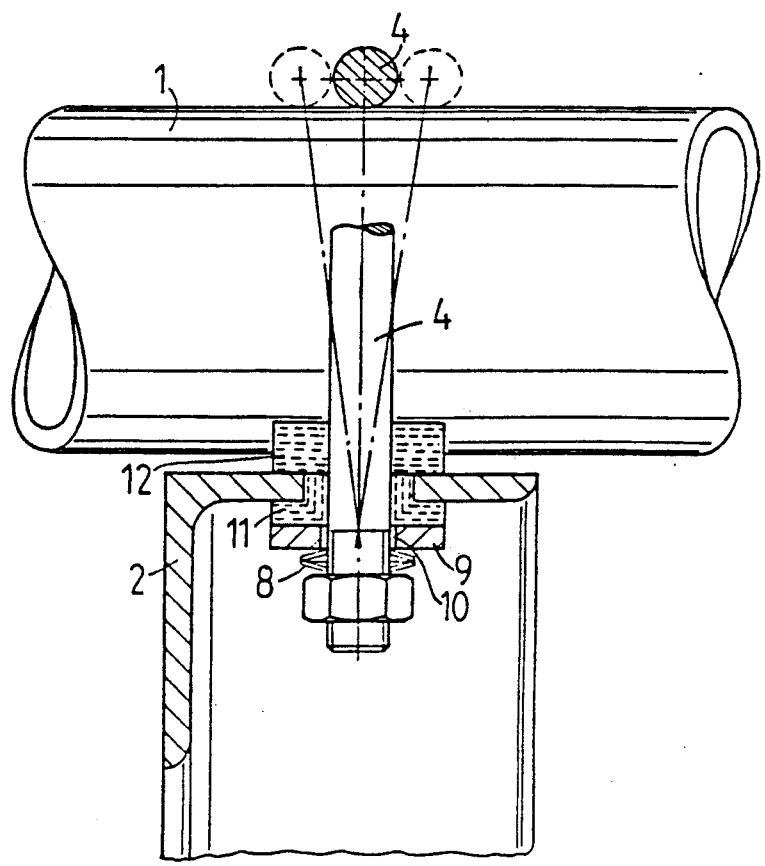
Figure 5:
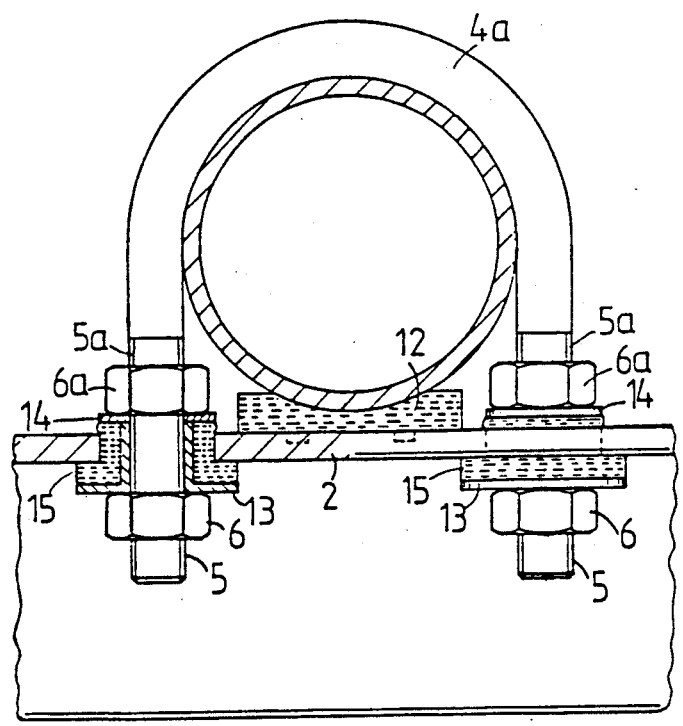
Figure 6:
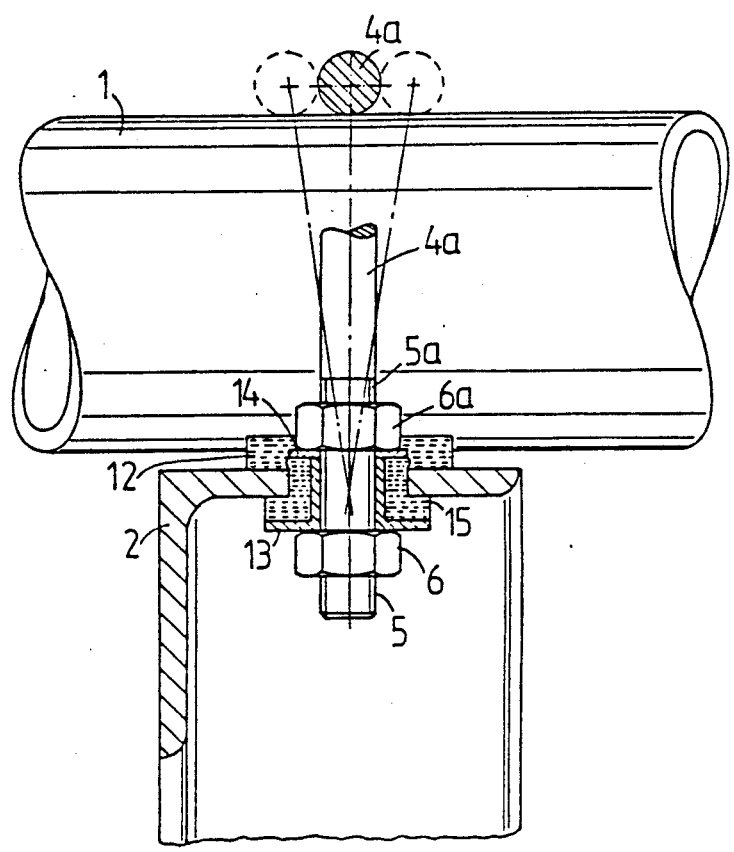

The embodiment of FIGS. 5 and 6 mainly corresponds to the embodiment of FIGS. 3 and 4, although there are no cup springs provided. In order to better support the sleeves 15 of a flexible, sound insulating material, the end threadings 5 of the pipe clip 4a are extended so as to go through the seat 2, and threadings 5a so that nuts 6a can be tightened against the sleeves 15 from the above. A support sleeve 13 and a support plate 14 respectively are arranged between the nuts 6, 6a and the sleeves 15 to protect the sleeves 15 against damage when said nuts are tightened.

I claim:

1. A device for clamping a pipe, comprising:
   a seat for supporting a pipe;
   a generally U-shaped clamp arranged to grip the pipe, the legs of the clamp extending through apertures in the seat and being secured to the seat, oppositely with respect to the pipe, by tightening means on the clamp;
   resilient means being arranged between said seat and said tightening means, and
   said apertures being wide enough to permit inclination of the clamp in order to enable the clamp to follow thermal longitudinal movement of the pipe without slipping.

2. A device according to claim 1, wherein said resilient means are formed by sleeves of a sound insulating material arranged around the legs of the clamp to extend through the respective apertures, said sleeves comprising a base portion lying between said pipe seat and said tightening means.

3. A device according to claim 1, wherein the resilient means are formed by sleeves of a flexible, sound insulating material and that a support of a resilient material, is arranged between the pipe and the seat.

* * * * *